Figure 1:
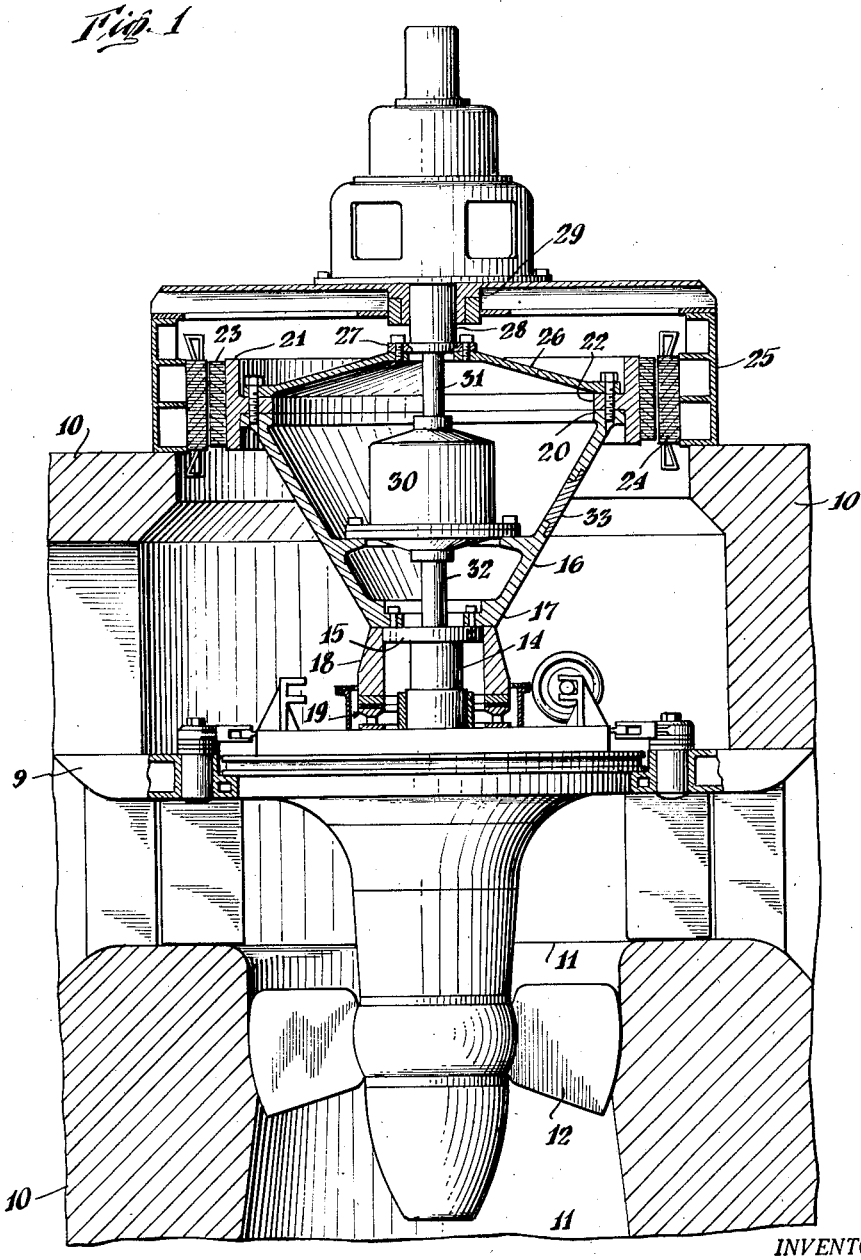

April 2, 1957 P. F. DANEL 2,787,715
COUPLING FOR VERTICAL HYDROELECTRIC GENERATOR
Filed March 31, 1953 2 Sheets-Sheet 1

INVENTOR.
Pierre F. Danel
BY
George H. Corey
ATTORNEY

April 2, 1957 P. F. DANEL 2,787,715
COUPLING FOR VERTICAL HYDROELECTRIC GENERATOR
Filed March 31, 1953 2 Sheets-Sheet 2

INVENTOR.
Pierre F. Danel
BY George H. Corey
ATTORNEY

United States Patent Office 2,787,715
Patented Apr. 2, 1957

2,787,715

COUPLING FOR VERTICAL HYDROELECTRIC GENERATOR

Pierre Francois Danel, Grenoble, France, assignor to Etablissements Neyrpic, Grenoble, France, a corporation of the French Republic Application March 31, 1953, Serial No. 345,931

Claims priority, application France April 11, 1952

10 Claims. (Cl. 290—52)

This invention relates to hydroelectric power installations, and more particularly to an improved connection between the generator rotor and the turbine shaft of a hydroelectric turbine-generator unit, especially in a unit wherein the generator rotor is mounted above the turbine.

In arrangements employed heretofore, the generator rotor has been connected to the turbine shaft by means of a cylindrical shaft usually referred to as the generator or alternator shaft. This shaft is a heavy, bulky and expensive piece of equipment and is usually manufactured by machining a steel forging.

As heretofore constructed the generator shaft likewise has a large diameter, usually at least as large as the turbine shaft, and where hollow to accommodate the connecting rod leading from a servo-motor to the turbine blades, as when the turbine is of the Kaplan type, the generator shaft has been made of somewhat larger diameter and with relatively heavier walls to withstand the high torsional stresses exerted thereon by the turbine shaft.

Consequently, the accessory equipment, such as the thrust and guide bearings for the generator shaft, if they are to be made in one piece, must not only have an inner diameter larger than the turbine shaft diameter, but also a diameter larger than the diameter of the flange of the turbine shaft by means of which the generator shaft is connected to the turbine shaft; this in order to make it possible to transmit torque from the turbine shaft to the generator shaft. As a result of the large diameter required of these accessory pieces, especially the guide bearing, there is considerable play between the guide bearing and the generator shaft and this leads to an undesirable increased eccentricity and variation of the magnetic field between the rotor and the stator of the generator. This eccentricity adversely affects the operation and power output of the installation. Also, because of the relatively great amount of play between the guide bearing and the generator shaft, the operating life of the guide bearing tends to be reduced and the whole assembly is subjected to uneven wear and stress.

It is an object of this invention to provide an improved connection between the rotor of a generator and the turbine shaft which is operatively connected thereto.

It is a further object to provide a driving connection between the turbine shaft and the rotor of a generator which is lighter in weight and less expensive to make and which at the same time has the advantage of transmitting the torque of the turbine to the rotor at a much greater distance from the axis of rotation, and preferably directly to the generator rotor at a point close to the periphery thereof which consequently improves mechanical efficiency.

It is another object of this invention to provide a connection between the rotor of a generator and the turbine shaft whereby the conventional hub of the rotor may be eliminated.

It is still another object of this invention to provide a connection between the generator rotor and the turbine shaft of a hydroelectric unit which makes possible the disassembly of the thrust bearing without having to lift the generator rotor from its normal operating position.

Figure 2:
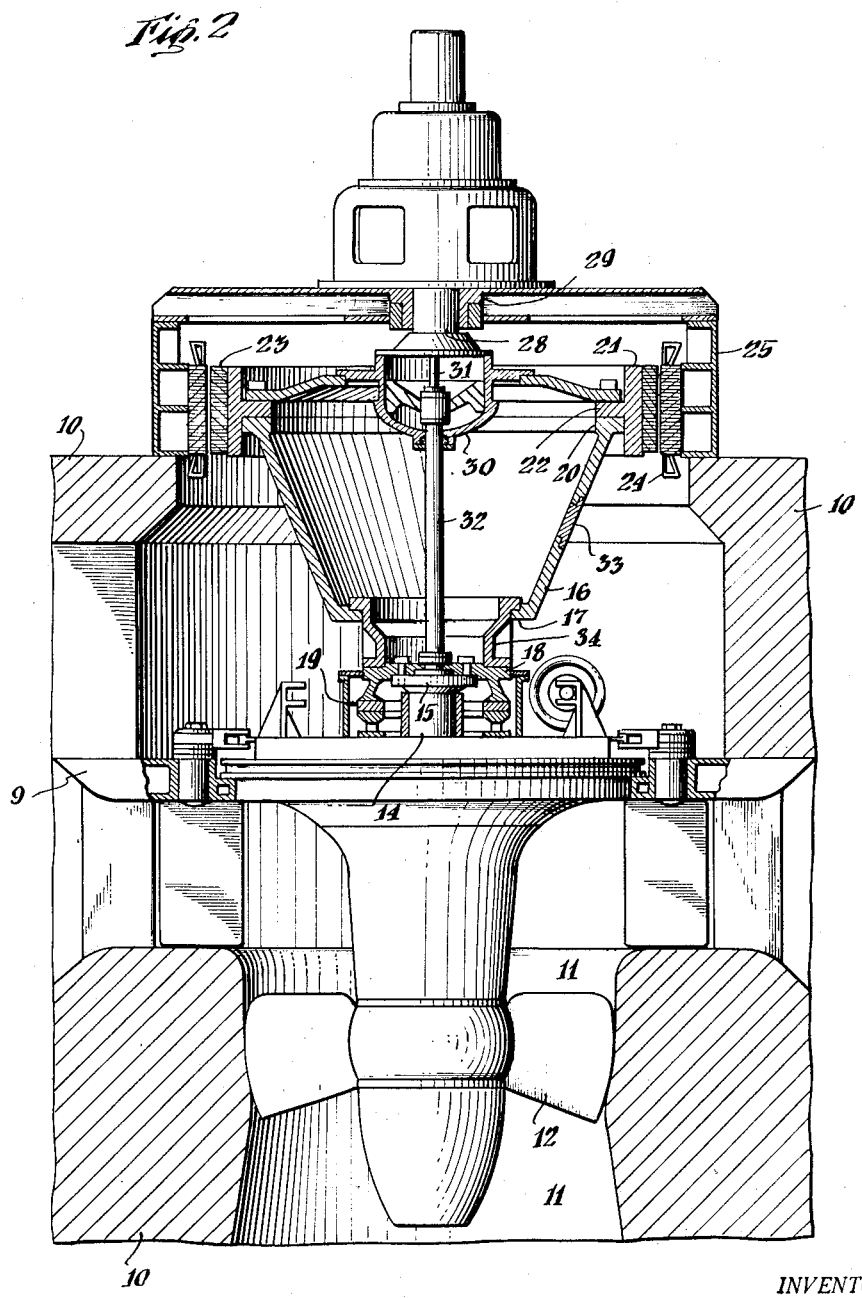

These and other objects of this invention and how they are achieved will become apparent by reference to the accompanying disclosure and drawing wherein:

Fig. 1 is a vertical view, partly in section, of a hydroelectric turbine-generator unit in accordance with my invention; and Fig. 2 is likewise a vertical view, partly in section, of a hydroelectric turbine-generator unit embodying a modification of my invention.

For the purpose of transmission of torque by means of aligned shafts, more efficient use can be made of the metal which goes to make up the shafts and less stress is imposed upon this metal when a hollow, torque-transmitting element or shaft having an increased diameter is employed.

For example, if a solid shaft were to be used to transmit torque, since the mass of the metal is concentrated at the axis of rotation, the stress imposed upon the metal making up the shaft is relatively great since no significant portion of the shaft is relatively removed from the axis of rotation. However, if one were to enlarge or to increase the diameter of the shaft and at the same time make it hollow and utilizing the same mass of metal, the stress imparted to the metal, now principally located on the outer periphery of the shaft and relatively removed from the axis of rotation, would be less. Moreover, because of the fact that the diameter of the shaft has been increased, a more rigid, dimensionally-stable shaft or connection is produced which is less susceptible to vibration and distortion arising out of the operational loads. Also, and in accordance with this invention, one end of this connection can be enlarged in diameter with respect to the other end, i. e. a connection substantially in the form of a hollow cone, with the result that the enlarged end can be directly connected to the rotor ring of the generator, thereby eliminating the need for a rotor hub and the corresponding hub arms, all of which leads to a further reduction in the weight of the unit.

Referring now to Fig. 1 which illustrates an embodiment of the invention as applied to a vertically disposed hydroelectric turbine-generator unit, foundation 10 is employed to support the unit. The flow of water through the casing 9 and downwardly within conduit 11 past the blades 12 of the turbine causes turbine shaft 14 to rotate. Turbine shaft 14 is connected by flange 15 to an inturned flange 17 on the lower end of a hollow, truncated conical connecting piece 16 which bears at its lower end on a thrust collar 18 of bearing assembly 19. The upper end 20 of connecting piece 16 is connected to the inner periphery of rotor 21 at flange 22. Mounted on the outside and along the periphery of rotor 21 are pole pieces 23. Surrounding rotor 21 is a stator 24 supported by a generator casing 25 located on the upper part of foundation 10. The flange 22 is connected at its upper side to cover 26 which in turn is connected to flange 27 of the upper guide shaft 28 which rotates in upper guide bearing 29 carried by generator casing 25. Located within connecting piece 16 is servo-motor 30 within which a piston, not shown, is moved up or down under the influence of hydraulic pressure exerted on one or the other side of the piston by oil or other fluid introduced through a pipe, not shown, enclosed within the hollow shaft 31. The servo-motor piston carries with it a rod connected to the turbine blades 12 and adjusts their pitch as desired. This rod, not shown, extends downward from the piston through the hollow shaft 32. A manhole 33 is provided in the side of connecting piece 16 to allow for access to the space inside connecting piece 16 and for inspection of the servo-motor. It should be noted that the outside of connecting piece 16 is free from any external projection, thereby reducing air friction losses.

The advantages of the arrangement illustrated by Fig. 1 are apparent. For example, servo-motor 30 is conveniently and safely located within connecting piece 16. Also, since the upper guide shaft 28 can have a smaller diameter than turbine shaft 14, the play between the guide shaft and the upper guide bearing can be reduced. This reduction in play, together with the fact that connecting piece 16 produces a very rigid and stable structure, permits a smaller gap between pole pieces 23 and stator 24, thereby giving rise to a more efficient utilization of the magnetic forces for the production of electric power. Furthermore, because of the rigidity imparted to the structure by connection piece 16, substantially higher operational speeds of rotation can be employed.

Referring now to Fig. 2 of the drawings, the parts or elements shown in Fig. 2 which correspond to the same parts or elements in Fig. 1, are identified by the same reference numerals. Conical connecting piece 16 is connected at its upper end 20 to the inside flange 22 of rotor 21. However, the lower end 17 of connecting piece 16 is connected to thrust collar 18 by means of an annular element or ring 34. Ring 34 is outwardly flanged as illustrated at both ends and is designed so that it can be moved up into the interior of connecting piece 16 after disconnection from connecting piece 16 and thrust collar 18. Thrust collar 18 besides being connected to ring 34 is also connected at its upper end to flange 15 of turbine shaft 14. As illustrated, the hydraulic thrust and the weight of all the rotating elements are imparted to bearing assembly 19 by means of thrust collar 18.

It is pointed out that should it be desirable to inspect and/or remove the bearing assembly 19, shaft 32 can be disconnected at about the point where it enters into turbine shaft 14 and pushed upwardly into servo-motor 30. After that, or even before, ring 34 can be disconnected at flange 17 from connecting piece 16 and from thrust collar 18 and then pushed upwardly into the hollow space within connecting piece 16, suitable arrangements of course having been provided in the meanwhile to support rotor 21. After thrust collar 18 has been disconnected from flange 15, the thrust collar can be removed. Similarly, the elements which go to make up bearing assembly 19, if they are in one piece, can also be removed, provided of course that the inside diameter of each is greater than the outside diameter of flange 15.

It will be apparent to those skilled in the art, in view of this disclosure and the accompanying drawings that many modifications and substitutions in the details of the construction may be made without departing from the spirit and scope of this invention.

I claim:

1. In a hydraulic turbine generator unit the combination with a turbine rotor disposed for rotation on an axis, a generator rotor having an annular peripheral member disposed coaxially with an for rotation on said axis, and an annular generator stator disposed coaxially with and in adjacent relation to said annular peripheral member of said generator rotor, said generator rotor and said stator being disposed in spaced relation along said axis from said turbine rotor, of a truncated conical hollow member coaxial with said axis of rotation and extending along said axis between its small end disposed adjacent and connected to said turbine rotor and its large end disposed with its periphery within and adjacent and connected to said annular peripheral member of said generator rotor for rotation of said generator rotor upon rotation of said turbine rotor, and a supporting structure providing portions thereof spaced along said axis and respectively adjacent said turbine rotor and said generator stator, said portions of said structure respectively supporting said turbine rotor and said stator against movement thereof along said axis, said supporting structure between said spaced portions thereof providing an annular chamber extending about said truncated conical hollow member and providing access to said conical member and to said connections thereof to said rotors.

2. In a hydraulic turbine generator unit the combination with a turbine rotor disposed for rotation on a vertical axis, a generator rotor having an annular peripheral member disposed coaxially with and for rotation on said vertical axis, and an annular generator stator disposed coaxially with and extending about said annular peripheral member of said generator rotor, said generator rotor and said stator being disposed in spaced relation upwardly along said axis from said turbine rotor, of a truncated conical hollow member coaxial with said axis of rotation and extending along said axis between its small end disposed adjacent and connected to said turbine rotor and its large end disposed with its periphery within and adjacent and connected to said annular peripheral member of said generator rotor for rotation of said generator rotor upon rotation of said turbine rotor, and a supporting structure providing portions thereof vertically spaced along said axis and respectively adjacent said turbine rotor and said generator stator, said portions of said supporting structure respectively supporting said turbine rotor and said stator against movement thereof along said vertical axis, said supporting structure between said vertically spaced portions thereof providing an annular chamber extending about said truncated conical hollow member and providing access to said conical member and to said connections thereof to said rotors.

3. In a hydraulic turbine generator unit the combination with a turbine rotor disposed for rotation on a vertical axis, a generator rotor having an annular peripheral member disposed coaxially with and for rotation on said vertical axis, and an annular generator stator disposed coaxially with and extending about said annular peripheral member of said generator rotor, said generator rotor and said stator being disposed in spaced relation upwardly along said axis from said turbine rotor, of a truncated conical hollow member coaxial with said axis of rotation and extending along said axis between its small end disposed adjacent and connected to said turbine rotor and its large end disposed with its periphery within and adjacent and connected to said annular peripheral member of said generator for rotation of said generator rotor upon rotation of said turbine rotor, a supporting structure providing portions thereof vertically spaced along said axis and respectively adjacent said turbine rotor and said generator stator, and a thrust bearing disposed adjacent said turbine rotor and supported on said portion of said structure adjacent said turbine rotor for supporting the thrust on said turbine rotor and said conical member and said generator rotor along said axis, said generator stator being supported on the other of said vertically spaced portions of said structure, said supporting structure between said vertically spaced portions thereof providing an annular chamber extending about said truncated conical hollow member and providing access to said conical member and to said connections thereof to said rotors.

4. In a hydraulic turbine generator unit the combination with a turbine shaft disposed for rotation on its axis, a turbine rotor carried on said shaft coaxially therewith, a casing extending about said turbine rotor and said shaft, said shaft projecting at one end thereof beyond said casing along said axis, a generator rotor having an annular peripheral member disposed coaxially with and for rotation on said axis, an annular generator stator disposed coaxially with and in adjacent relation to said annular peripheral member of said generator rotor, said generator rotor and said stator being disposed in spaced relation along said axis from said turbine rotor in the direction of projection of said shaft, of a truncated conical hollow member coaxial with said axis of rotation and extending along said axis between its small end disposed adjacent and connected to said projecting portion of said shaft and its large end disposed with its periphery within and adjacent and connected to said annular peripheral member of said generator rotor for rotation of said generator rotor upon rotation of said turbine rotor and shaft, and a supporting structure providing portions thereof spaced along said axis and respectively adjacent said turbine rotor and said generator stator, said portions of said structure respectively supporting said turbine rotor carried on said shaft and said stator against movement along said axis, said supporting structure between said spaced portions thereof providing an annular chamber adjacent and exterior to said casing and extending about said truncated conical hollow member and providing access to said conical member and to said connections thereof to said shaft and to said generator rotor.

5. In a hydraulic turbine generator unit the combination as defined in claim 1 which comprises a servomotor supported by and within said truncated conical hollow member.

6. In a hydroelectric turbine generator unit the combination as defined in claim 1 in which said truncated conical hollow member is rigidly connected to said turbine rotor and to said generator rotor.

7. In a hydroelectric generator unit the combination as defined in claim 1 which comprises an annular intermediate member coaxial with said conical member and rigidly connected to the small end of said truncated conical member and connecting said conical member to said turbine rotor.

8. In a hydroelectric turbine generator unit the combination as defined in claim 1 in which the said conical member is provided with an opening in the small end thereof concentric with said axis of said conical member, and an annular intermediate member disposed within said opening coaxial with and removably connected to said conical member and to said turbine rotor, said annular intermediate member having a form capable of passing through said opening parallel to said axis of rotation toward said generator rotor into the space within said conical member upon disconnection of said annular intermediate member.

9. In a hydroelectric turbine generator unit the combination as defined in claim 8 which comprises a thrust bearing having a stationary thrust bearing element supported on one of said portions of said structure, and a rotatable thrust bearing element bearing against said stationary bearing element and connected to said annular intermediate member for rotation therewith.

10. In a hydroelectric turbine generator unit the combination as defined in claim 1 which comprises a thrust bearing having a stationary thrust bearing element supported on one of said portions of said structure, and a rotatable thrust bearing element bearing against said stationary bearing element and connected to said conical member for rotation therewith.

References Cited in the file of this patent

UNITED STATES PATENTS

| | | |
|---|---|---|
| 1,224,933 | Jordan | May 8, 1917 |
| 1,258,154 | Shepherd et al. | Mar. 5, 1918 |
| 1,632,357 | White | June 14, 1927 |
| 1,704,362 | Johnson | Mar. 5, 1929 |
| 2,281,214 | Van Erp | Apr. 28, 1942 |
| 2,685,652 | Wales | Aug. 3, 1954 |

FOREIGN PATENTS

| | | |
|---|---|---|
| 447,256 | Germany | May 1, 1928 |
| 930,812 | France | Sept. 1, 1947 |